United States Patent
Ooi et al.

(10) Patent No.: US 6,606,213 B1
(45) Date of Patent: Aug. 12, 2003

(54) ACTUATOR RESONANCE SCREENING IN DISC DRIVES

(75) Inventors: Kian Keong Ooi, Singapore (SG); Jack Ming Teng, Singapore (SG); Soon Wah Leow, Singapore (SG); Ming Zhong Ding, Singapore (SG)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/332,351

(22) Filed: Jun. 11, 1999

Related U.S. Application Data

(60) Provisional application No. 60/089,002, filed on Jun. 11, 1998.

(51) Int. Cl.[7] .............................................. G11B 21/02
(52) U.S. Cl. ....................... 360/75; 360/77.2; 360/78.04
(58) Field of Search ................................ 360/75, 77.01, 360/77.02, 78.01, 78.04, 46

(56) References Cited

U.S. PATENT DOCUMENTS

| | | | |
|---|---|---|---|
| 4,398,228 A | 8/1983 | Bauck | 360/77.02 |
| 4,477,755 A | 10/1984 | Rickert | 318/611 |
| 4,600,868 A | 7/1986 | Bryant | 318/567 |
| 5,205,190 A | 4/1993 | Kohring | 74/574 |
| 5,369,345 A | 11/1994 | Phan et al. | 318/561 |
| 5,459,921 A | 10/1995 | Hudson et al. | 29/603.03 |
| 5,654,841 A | 8/1997 | Hobson et al. | 360/75 |
| 5,657,187 A | 8/1997 | Hatch et al. | 360/244.8 |
| 5,671,098 A | 9/1997 | Mathews et al. | 360/67 |
| 5,757,580 A | 5/1998 | Andress et al. | 360/97.02 |
| 5,812,343 A | 9/1998 | Budde et al. | 360/244.6 |
| 6,064,540 A * | 5/2000 | Huang et al. | 360/75 |
| 6,067,203 A * | 5/2000 | Ottesen et al. | |
| 6,067,362 A * | 5/2000 | Lemanski et al. | 381/94.1 |
| 6,456,452 B1 * | 9/2002 | Hobson et al. | 360/78.07 |

FOREIGN PATENT DOCUMENTS

JP            62289978 A   * 12/1987

* cited by examiner

Primary Examiner—David Hudspeth
Assistant Examiner—Mitchell Slavitt
(74) Attorney, Agent, or Firm—David K. Lucente; Derek J. Berger

(57) ABSTRACT

A disc drive system and method of screening an actuator resonance includes a servo controller providing a multi-servo zone architecture. The servo controller partitions the disc into a plurality of servo zones. Each of the servo zones has a corresponding servo gain. When an actuator resonance is detected in one of the servo zones, the servo controller reduces the corresponding servo gain of the detected servo zone such that a drive with very low resonance at a certain zone does not affect the servo bandwidth of the other good zones. Accordingly, a drive with very low resonance is prevented from being scrapped. Further, the screening technique allows a drive to have an adequate servo margin for its normal operation after going through a resonance detection test.

14 Claims, 5 Drawing Sheets

ACTUATOR RESONANCE SCREENING IN DISC DRIVES

This is a regular utility patent application for the U.S. provisional patent application, Serial No. 60/089,002, filed Jun. 11, 1998, which is incorporated herewith by reference.

FIELD OF THE INVENTION

The present invention relates generally to a disc drive system and method. More particularly, the present invention relates to a system and method for screening actuator resonance in a disc drive.

BACKGROUND OF THE INVENTION

Generally, a disc drive system stores data on rotating media, for example a magnetic disc, and uses read/write heads suspended on a moving armature. The heads read/write the data on the rotating media as the surface of the rotating media moves past them. During track access and read/write operations, actuator resonance can be one of the problems. For example, when the drive performs a seeking operation, a resonance may cause the actuator to oscillate such that the head is not able to stabilize at a desired track center over the media. Such error is often referred to as a position error and can be represented by a Position Error Signal (PES). Typically, when a large oscillating PES is detected, the drive is determined to have a resonance mode and therefore the read/write operation cannot be carried on further.

It is known that all physical parts of the disc drive system possess certain resonant modes, where, if a frequency equal to the resonant mode frequency is applied to the system, the part will resonate. The actuator of the disc drive system also possesses such modes. When the actuator is excited, it can generate a large amount of movement of the actuator arm, in turn a large amount of movement of the read/write heads. This prevents the heads from reading/writing the correct tracks center on the disc surface and may result in the disc drive controller inhibiting a write or read. The inhibiting operation is also known as a write protect/write unsafe or a read protect/read unsafe. When the duration of the disturbance is prolonged, a write or read fault is declared, i.e. the disc drive indicates that it cannot write or read the data, despite repeated attempts. As a result, a fatal error condition occurs.

Due to the ever increasing track densities, Track Per Inch (TPI), required by the disc drive industry, actuator resonance has become one of the major problems seen in disc drive operation. The known types of actuator resonance are slider resonance, arm flexure resonance, and other types of structural resonance. A slider is the suspension which holds heads to the actuator arm. The windage between the head and the rotating disc may cause the slider to oscillate at its resonant frequency which will cause the head not to stay on the track properly, i.e., large oscillating PES. An arm flexure resonance is generally defined as the arm of the actuator, due to the actuator resonance, bending toward or away from the track center substantially such that data cannot be read from the track or written to the track. During manufacturing of a disc drive, it can be quite difficult to determine whether a drive exhibits actuator resonance or resonance in another component.

Recent developments in hard disc drives especially with a higher TPI make the drive's actuator more difficult in keeping heads on track. The higher the TPI, the smaller the track pitch (i.e., width of a track ). This makes the actuator motor, often referred to a drive's Voice Coil Motor (VCM), more sensitive to resonance if compared to drives with a lower TPI.

A simple test to verify whether a drive exhibits resonance is to perform a seeking operation. In a drive seeking operation, an acceleration/deceleration current is applied to the VCM depending on its movement. The drive seeks from one track to another. This excitation will cause the actuator to resonate at its natural frequency. If a drive fails to seek and settle down on the desired track, the drive may be experiencing a resonance.

A drive can also be tested for resonance symptoms by increasing the gain of a servo system. The servo system generally provides a servo control to stabilize the W/R head over a track during a read/write operation. The gain of the servo system controls the settling time of the head when the drive seeks to a track. For a certain system, the gain of the servo system affects the stability of the servo system—the higher the open loop gain of the servo system, the smaller the gain margin. With a higher servo gain, the drive is more prone to any resonance mode as its open loop gain margin will be lowered. With a smaller gain margin, the open loop gain response of a VCM resonance frequency region is more likely to reach the 0-dB point, causing the actuator to oscillate. When the actuator oscillates, the time to settle is much longer. By observing the settling time, drives with resonance can be detected.

The existing typical resonance screening system used at the manufacturing stage of a disc drive is a "Dynamic Signal Analyzer" by Hewlett Packard (HP). This device can be used to get the open loop bode plot of a control system. From the bode plot, we can tell whether the control system has resonance and also at which frequency. Although this analyzer detects the actuator resonance, it can only be used off-line and is very time consuming. It is only used in the design phase and failure analysis phase to verify whether the actuator really has a resonance problem.

Also, in current practice, once a drive is determined to exhibit actuator resonance, the entire drive is rejected. However, a drive does not necessarily exhibit resonance at all regions across the disc. Thus, the current practice of rejecting a drive with very low resonance may lower the production yield unnecessarily.

The present invention provides a solution to the above and other problems and offers advantages over the prior solutions to the above and other problems.

SUMMARY OF THE INVENTION

The present invention provides a disc drive system, a method, or an apparatus for detecting drive resonance and compensating the drive with a symptom of resonance.

In general terms, the present invention provides a resonance screening system by establishing a multi servo zone architecture. More particularly, the present invention provides a resonance screening system by partitioning a disc into several servo zones. By partitioning the disc into several servo zones, each with its associated gain will prevent drives, especially the drives with very low resonance from being scrapped. One of the ways of doing so is to reduce the servo gain of the region where resonance occurs. Reducing a servo gain increases an open loop gain margin for that weak zone, i.e., the zone with a resonance. One of the resonances which can be screened in the present invention is actuator resonance.

One of the advantages of the present invention is that by partitioning the disc into several servo zones, a drive with little or very low actuator resonance at a certain zone does not affect a servo bandwidth of the other good zones, i.e., the zones without actuator resonance. The servo gain of the good zones does not have to be adjusted. Thus, the drive with very low resonance is not rejected, thereby increasing the production yield of the drive.

Accordingly, the present invention provides a cost-effective resonance screening technique. The present resonance screening technique significantly reduces the number of rejected drives at the manufacturing stage, thus improving the production yield. The present resonance screening technique also ensures that a drive which passes the resonance detection test has an adequate servo margin for its normal operation after going through the test.

These and various other features as well as advantages which characterize the present invention will be apparent upon reading of the following detailed description and review of the associated drawings.

DETAILED DESCRIPTION

In the following description of the exemplary embodiment, reference is made to the accompanying drawings which form a part hereof, and in which is shown by way of illustration embodiments in which the invention may be practiced. It is to be understood that other embodiments may be utilized as structural changes may be made without departing from the scope of the present invention.

Figure 1:
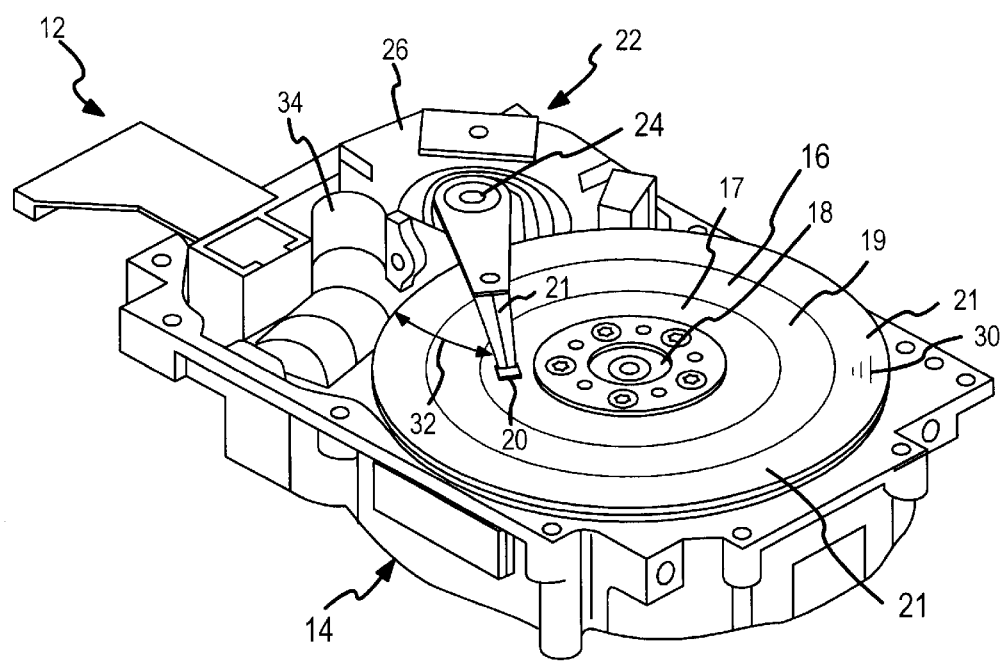
FIG. 1 is a perspective view of a disc drive system in which the present invention can be adapted.

FIG. 1 illustrates a perspective view of a disc drive system 12 in which a preferred actuator resonance screening system 10 (FIG. 2) can be applied. The disc drive system 12 includes a housing base 14 and a top cover (not shown) which cooperatively engage to form a sealed housing which serves to protect delicate internal components from external disturbance and/or contaminants.

In FIG. 1, a plurality of discs, one of which is referenced as 16, are mounted for rotation on a spindle motor hub 18. An array of heads, one of which is referenced as 20, are mounted on arms 21 moved by an actuator 22. The actuator 22 swings the arms/heads about a pivot shaft 24 under the control of an actuator motor, shown generally at 26. The actuator motor 26 is driven along an arc path 32 to controllably move the heads 20 to any desired position on one of a plurality of tracks 30 of the disc 16. The actuator motor 26 is controlled by a servo controller 28 (see FIG. 2). Signals used to control the actuator motor 26, as well as signals to and from the heads 20, are passed via a circuit cable 34. The actuator motor 26 is known as a Voice Coil Motor (VCM) or moving coil motor. Other equivalent actuator motors can be used to swing the arms 21.

The disc drive system 12 also includes servo control logic for moving the heads 20 to any one track 30 and maintaining the heads 20 aligned with the track 30 for reading or writing data. A clock crystal 36 inputs a standard clock in a Phase Locked Loop (PLL) 38 which provides a clock rate for various control loops or circuits including the servo controller 28.

In a preferred embodiment of the present invention, the disc 16 is divided into a plurality of servo zones 17, 19, and 21. Each of the servo zones has an associated or corresponding servo gain. Once an actuator resonance is detected in one of the servo zones, the servo controller 28 reduces the servo gain corresponding to the detected servo zone to increase the open loop gain margin. Accordingly, a drive with little or very low resonance at a certain zone does not affect the servo bandwidth of the other good zones. Accordingly, the drive with very low resonance is not rejected, thus increasing the production yield. The drive with very low resonance is compensated with an adequate servo margin for its normal operation after going through the actuator resonance test.

Figure 2:
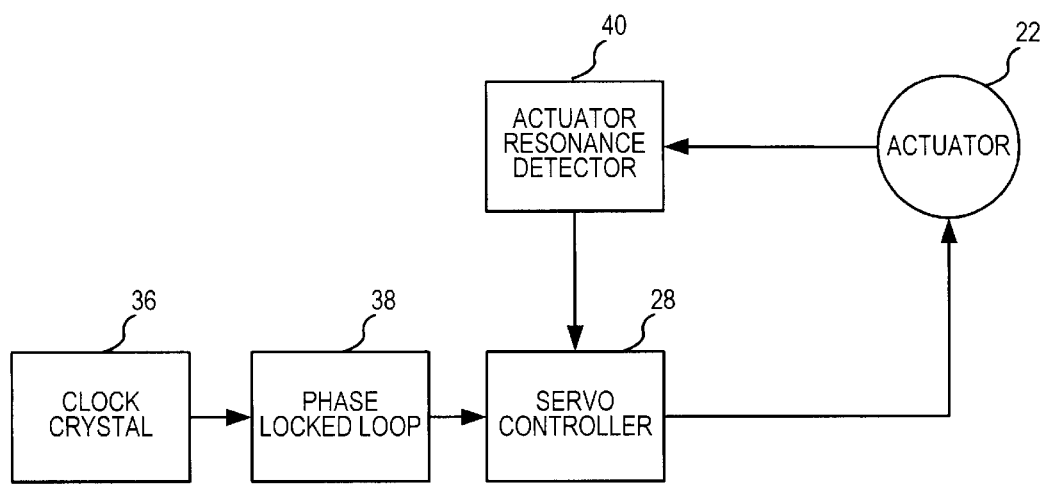
FIG. 2 is a block diagram of a preferred embodiment of an actuator resonance screening system in accordance with the present invention implemented in the disc drive system shown in FIG. 1.

As shown in FIG. 2, an actuator resonance detector 40 detects the actuator resonance. It is appreciated by a person skilled in the art that various detection devices can be implemented within the scope of the present invention. The detector 40 measures the settling time of the drive. If the settling time exceeds a certain criteria, the resonance can be declared, i.e. once the detector 40 detects an actuator resonance, it sends a signal to the servo controller 28. The servo controller 28 in turn reduces the servo gain of the detected servo zone and sends the corresponding control signal to the actuator 22.

Figure 3:
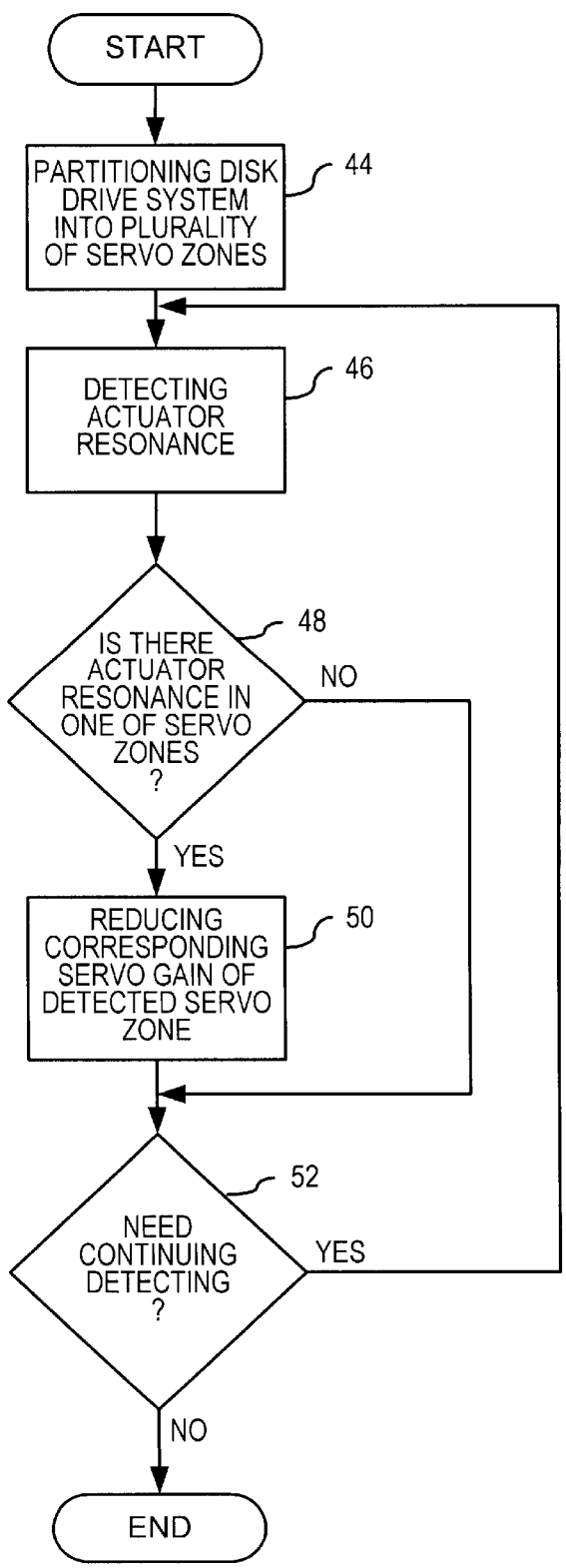
FIG. 3 is a flowchart illustrating an actuator resonance screening operation in accordance with the present invention.

FIG. 3 illustrates one preferred embodiment for the actuator resonance screening operation flow 42. It is appreciated that other operations or different sequence of the shown operation flow may be used without departing from the principles of the invention. The operation flow 42 starts with operation 44 partitioning the disc drive system into a plurality of servo zones. The detector 40 (FIG. 2) detects an actuator resonance in operation 46. If an actuator resonance in one of the servo zones is detected in decision operation 48, i.e., YES path, the servo controller 28 reduces the corresponding servo gain of the detected servo zone in operation 50. If decision operation 52 determines a need to continue the detection of the resonance, the operation flow returns to operation 46. If the decision operation 52 determines all zones have been tested, the operation flow terminates at END. If no actuator resonance is detected in decision operation 48, i.e., NO path, the operation flow goes to operation 52.

Figure 4:
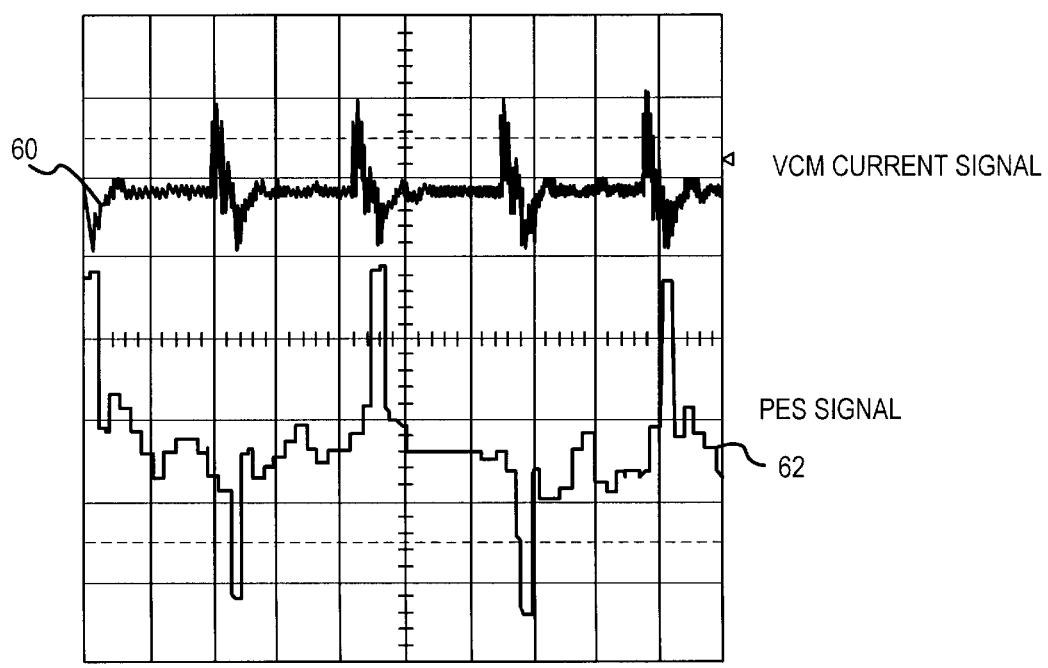
FIG. 4 is a schematic diagram illustrating a shorter settling time due to no actuator resonance of an actuator resonance detection test.
Figure 5:
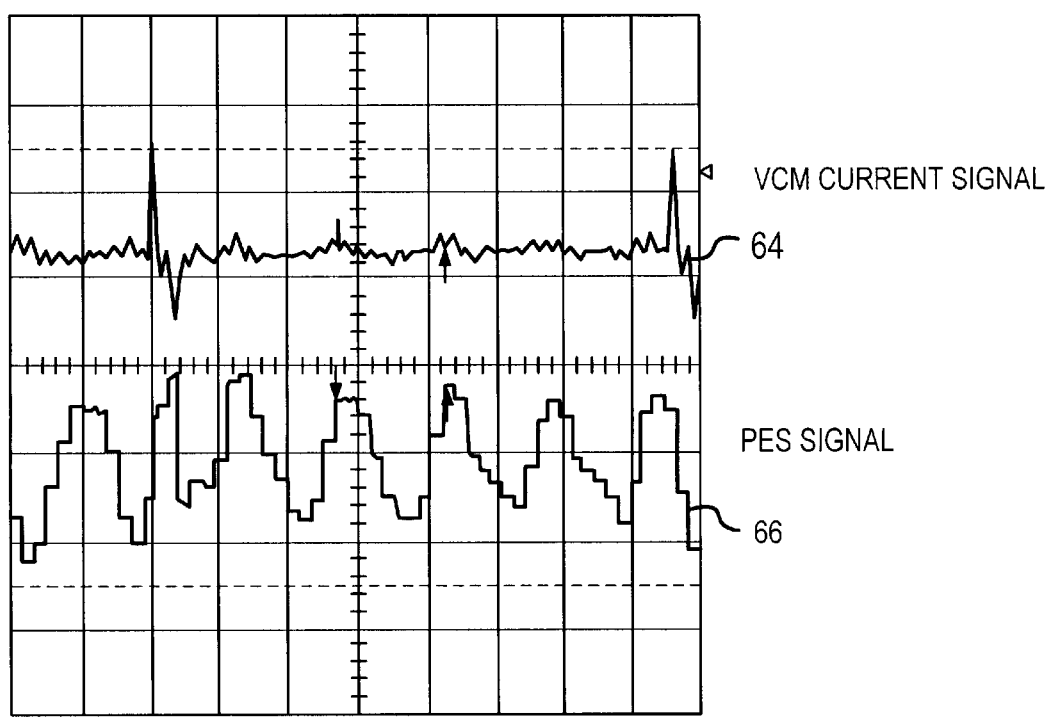
FIG. 5 is a schematic diagram illustrating a longer settling time due to an actuator resonance of an actuator resonance detection test in comparison with FIG. 4.

FIGS. 4 and 5 illustrate an exemplary seek and settling of an actuator resonance detection test. The actuator resonance detection test is illustrated by performing a sequential track seek operation. It will be appreciated by a person skilled in the art that other operations, such as a short seek operation, a long seek operation (depending on the number of tracks), etc., can be performed within the scope of the present invention. In these operations, the VCM is excited by injecting external disturbance in a form of, for example, a current to the VCM. This disturbance causes the VCM to resonate at its natural frequency. In another preferred embodiment, the disturbance is accomplished with the injection of Gaussian's Noise at the VCM.

In FIG. 4, the VCM is doing four sequential seeks in the VCM signal graph 60 (top). The settling is represented by a Position Error Signal (PES) graph 62 (bottom). The PES does not exhibit an actuator resonance, and the settling time is much shorter than the one shown in FIG. 5 which will now be discussed.

In FIG. 5, the VCM is doing two sequential seeks in the VCM signal graph 64 (top). The settling is represented by a Positioning Error Signal (PES) graph 66 (bottom). The PES in FIG. 5 exhibits an actuator resonance. In FIG. 5, the PES oscillates, and the drive has a long settling time. The resonant frequency can be calculated from the time difference, $\Delta t$, between two neighboring peaks, i.e. $1/\Delta t$. In FIG. 5, $\Delta t$ is about 1.54801 ms, and the resonant frequency is about 645.99 Hz.

Of course, other types of transformations, for example, Fast Fourier Transformations (FFT), may be used within the scope of the present invention. This is done by injecting Gaussian's Noise at the VCM. Also, by implementing DFT analysis of PES in the servo controller 28, the gain of each frequency component in the servo system can be calculated. These gains can be used to determine the existence of various resonance components in the drive.

To compensate a drive with resonance, one preferred method is to reduce the servo gain. Generally, the drive does not exhibit resonance at all regions or zones across the disc. To maintain the servo gain in the good zones (the servo zone without resonance) while reducing the servo gain in the bad zone (the servo zone with resonance), the servo controller 28 is configured and arranged to provide a multi-servo zone architecture. For example, the servo controller is designed to provide a plurality of servo zones, such as servo zones 17, 19, and 21. Each of the servo zones has its own corresponding servo gain. The servo controller 28 controls the servo gain of each of the zones. When an actuator resonance in one of the servo zones is detected, the servo controller 28 reduces the gain of the zone with the detected resonance. It is appreciated that other types of multi-servo zone architecture can be implemented. For example, the servo controller can be configured and arranged to provide a hierarchy of servo zones, wherein each hierarchy layer has a servo gain, without departing from the principles of the present invention.

It is appreciated that, in addition to actuator resonance, other types of resonance can also be screened by utilizing the present screening technique.

The screening technique in accordance with the present invention detects drives with resonance during the early stage of production testing as well as to compensate a drive with resonance such that a drive with very low resonance at a certain zone does not affect the servo bandwidth of other zones. Also, production cost and time are considerably reduced as a drive with very low resonance can be detected earlier without using expensive equipment, such as the Dynamic Signal Analyzer made by HP. In addition, the root cause of a drive resonance failure can be found faster because the screening technique is implemented within the drive code and no additional circuitry is needed to connect the drive to the Dynamic Signal Analyzer for analysis. Further, the production yield is much higher as drives with very low resonance can be salvaged, and these drives can still be used for a normal disc drive operation.

In accordance with the one exemplary preferred embodiment, a method of screening actuator resonance in a disc drive system (such as 12) including a servo controller (such as 28), comprises: partitioning a disc of the disc drive system into a plurality of servo zones (such as operation 44), each of the servo zones having a corresponding servo gain; detecting an actuator resonance in one of the servo zones (such as operations 46 and 48); and reducing the corresponding servo gain of the detected servo zone such that the drive with very low resonance at a certain zone does not affect the servo bandwidth of the other zones (such as operation 50).

In accordance with the one exemplary preferred embodiment, the actuator resonance detecting operation (such as operation 46) is performed by a frequency response analyzer. One type of the frequency response analyzer is a Discrete Fourier Transform (DFT) analyzer.

In accordance with the one exemplary preferred embodiment, a disc drive system (such as 12) having an actuator (such as 22) comprises: a servo controller (such as 28), the servo controller (such as 28) partitioning a disc (such as 16) into a plurality of servo zones, each of the servo zones having a corresponding servo gain; and an actuator resonance detector (such as 40) operatively connected to the actuator (such as 22) and the servo controller (such as 28). Once an actuator resonance in one of the plurality of servo zones is detected by the actuator resonance detector (such as 40), the servo controller (such as 28) reduces the corresponding servo gain of the detected servo zone such that the drive with very low resonance at a certain zone does not affect the servo bandwidth of the other zones.

In accordance with the one exemplary preferred embodiment, the actuator resonance detector (such as 40) includes a frequency response analyzer. One type of the frequency response analyzer can be a Discrete Fourier Transform (DFT) analyzer.

In accordance with the one exemplary preferred embodiment, a method of screening actuator resonance in a disc drive system (such as 12) including a servo controller (such as 28), comprises: partitioning a disc (such as 16) of the disc drive system (such as 12) into a plurality of servo zones (such as operation 44), each of the servo zones having a corresponding servo gain; detecting an actuator resonance in one of the servo zones (such as operations 46 and 48); and reducing the corresponding servo gain of the detected servo zone such that the drive with very low resonance at a certain zone does not affect the servo bandwidth of the other zones (such as operation 50).

In accordance with the one exemplary preferred embodiment, a disc drive system (such as 12) comprises: a servo controller (such as 28), the servo controller (such as 28) partitioning a disc (such as 16) into a plurality of servo zones, each of the servo zones having a corresponding servo gain; and a resonance detector (such as 40) operatively connected to the servo controller (such as 28); wherein once a resonance in one of the plurality of servo zones is detected by the actuator resonance detector (such as 40), the servo controller (such as 28) reduces the corresponding servo gain of the detected servo zone such that the drive with very low resonance at a certain zone does not affect the servo bandwidth of the other zones.

In accordance with the one exemplary preferred embodiment, a disc drive system (such as 12), comprises: a servo controller (such as 28), the servo controller (such as 28) partitioning a disc (such as 16) into at least two servo zones, each of the servo zones having a servo gain controlled by the servo controller (such as 28); and wherein the servo controller (such as 28) is configured and arranged to adjust at least one of the servo gains.

It is to be understood that even though numerous characteristics and advantages of various embodiments of the present invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the disc drive system while maintaining substantially the same functionality without departing from the scope and spirit of the present invention. In addition, although the preferred embodiment described herein is directed to a system and a method of screening a resonance for a disc drive system, it will be appreciated by those skilled in the art that the teachings of the present invention can be applied to other drive systems without departing from the scope and spirit of the present invention.

What is claimed is:

1. A method of screening actuator resonance in a disc drive system including a servo controller, comprising the steps of:
   (a) partitioning a disc of the disc drive system into a plurality of servo zones, each of the servo zones having a corresponding servo gain;
   (b) detecting an actuator resonance in one of the servo zones; and
   (c) reducing the corresponding servo gain of the servo zone in which the actuator resonance was detected.

2. The method of claim 1, wherein the detecting step (b) is performed by a frequency response analyzer.

3. A disc drive system having an actuator, comprising:
   (a) a servo controller, the servo controller partitioning a disc into a plurality of servo zones, each of the servo zones having a corresponding servo gain;
   (b) an actuator resonance detector, operatively connected to the actuator and the servo controller, which detects actuator resonance; and
   (c) gain control, in response to an actuator resonance in one of the plurality of servo zones detected by the actuator resonance detector, which reduces the corresponding servo gain of the servo zone, in which the actuator resonance was detected, in the servo controller.

4. The disc drive system of claim 3, wherein the actuator resonance detector includes a frequency response analyzer.

5. The disc drive system of claim 4, wherein the frequency response analyzer is a Discrete Fourier Transform (DFT) analyzer.

6. An apparatus in a disc drive for minimizing effects of actuator resonance in the disc drive, the apparatus comprising:
   an actuator adjacent a data storage disc in the disc drive; and
   means for adjusting a servo gain of one of a plurality of servo zones defined on the disc in response to an actuator resonance detected in the one servo zone.

7. The apparatus of claim 6, further comprising an actuator resonance detector operatively connected to the actuator detecting the actuator resonance.

8. The apparatus of claim 7, further comprising a gain control in a servo controller connected to the actuator for reducing the servo gain of the one servo zone in the servo controller such that the drive with very little resonance at a certain zone does not affect a servo bandwidth of other zones.

9. The method of claim 1 wherein a drive with very little resonance at a certain zone does not affect a servo bandwidth of the other zones.

10. The method of claim 1 wherein the detecting step is performed by the disc drive system.

11. The method of claim 1 wherein the actuator resonance is detected by a position error signal.

12. The disc drive system of claim 3 wherein the actuator resonance detector is internal to the disc drive system.

13. A method of reducing actuator resonance in a disc drive, the disc drive including a disc, an actuator positioned adjacent the disc, and a servo controller for controlling the movement of the actuator, comprising steps of:
   (a) partitioning the disc into a plurality of servo zones, each servo zone being associated with a unique region of the disc;
   (b) maintaining a reduced servo gain for at least one servo zone associated with a detected resonance of the actuator as the actuator travels over the region of the disc associated with the at least one servo zone; and
   (c) adjusting gain of the servo controller with the reduced servo gain whenever the actuator travels over the region of the disc associated with the at least one servo zone having the detected resonance.

14. The method of claim 13 wherein the maintaining step (b) further comprises steps of:
   (b)(i) maintaining a servo gain for each servo zone;
   (b)(ii) determining an actuator resonance as the actuator travels over a region of the disc associated with a given servo zone;
   (b)(iii) reducing the servo gain of the given servo zone to reduce the resonance.

* * * * *